United States Patent Office 3,332,765
Patented July 25, 1967

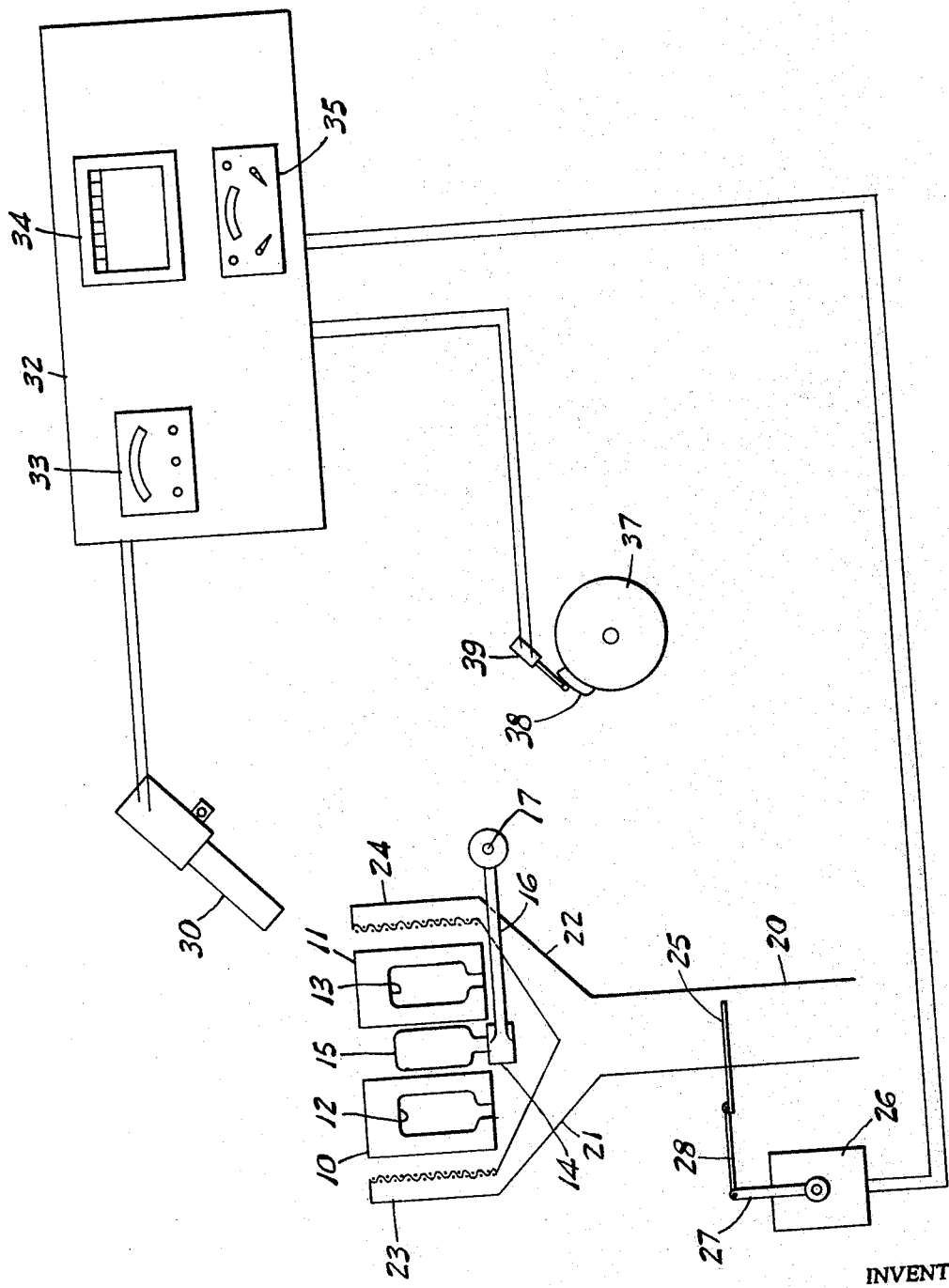

3,332,765
INFRA-RED HEAT CONTROL FOR
GLASS-FORMING MOLDS
Carlin S. Champlin, Brockway, Pa., assignor to Brockway
Glass Company, Inc., Brockway, Pa.
Filed Oct. 9, 1964, Ser. No. 402,733
12 Claims. (Cl. 65—162)

This invention relates to novel apparatus for use in the manufacture of glass articles and more particularly to control means for automatically maintaining a relatively constant parison temperature.

One of the most common methods of manufacturing glass articles such as glass bottles and jars or similar glass containers on a mass production basis is by means of blowing machines wherein gobs are fed successively to blank molds where they are primarily formed into individual blanks or parisons and then automatically transferred to blow molds where they are blown to final form.

It is well known that the temperature of the glass of parison or blank at the time of blowing thereof affects the distribution of glass in the blowing of the article. Since the external shape of the finally blown container is accurately determined by the shape of the blow mold cavity, this variation of glass distribution evidences itself particularly in the interior configuration of the article which in turn affects the wall thickness at various parts of the blown article. Other characteristics of the glass of the blown article are affected by the temperature of the glass at the time of blowing.

From this it will be seen that the ability to provide an automatic regulating effect which tends to render the glass temperature of the parison more constant as to a succession of parisons or blanks is a highly advantageous advance in the machine blowing of glass articles such as containers.

Broadly speaking, the apparatus of the present invention provides means whereby instantaneous readings of the temperatures of each of a succession of glass parisons or blanks are taken in timed relation with the cycles of operation of the glass forming machinery, whereby the temperature readings of the successive parisons are taken at corresponding points in the machine cycle.

It is to be understood that the temperature of a parison falls from the time when the blank mold opens to free the same until the parison moves to the blow mold and the blow mold closes thereon. Hence the importance of reading parison temperature at a given instant during this period. Also, temperatures may vary from one part of a parison to another, the temperature usually remaining higher where the mass is greatest. Accordingly, for purposes of accurate comparative readings, the temperature should be taken at corresponding points on each successive parison.

With these requirements in view, the present apparatus takes temperature readings by focusing an infra-red sensitive photo tube on a predetermined point on successive parisons, preferably at a time shortly after the blank mold opens and before the blank or parison has begun its movement to the blow mold. Means are provided whereby the photo tube itself or the output therefrom is effective only for an extremely short interval of time in each machine cycle, so that readings are taken when the parison is at a known position, corresponding from one cycle to the next, and at a predetermined constant time interval so that the degree of cooling of the parison corresponds as to successive parisons.

In the apparatus of the present invention successive temperature indications are caused to regulate the temperature of the blank mold by causing varying amounts of coolant to be directed toward and against the blank mold. In this manner increases in parison temperature are counteracted by increased cooling of the blank mold which thus lowers the parison temperature to a predetermined level. In this manner the temperatures of successive parisons at given times after they leave the blank mold are rendered uniform and constant and consequently the temperature of glass in the blow mold is likewise rendered relatively constant, with more uniform and more predictable blowing results.

By way of example, the following specification describes and the accompanying drawing illustrates schematically one application of the method and apparatus of the present invention. It is to be understood, however, that many modifications may be made without departing from the invention which is limited only as defined in the appended claims.

The single figure of the drawing is a schematic representation of one form of the apparatus of the present invention showing a blank mold section of a bottle blowing machine, blank mold cooling means, and control means for the cooling means responsive to the temperature of glass blanks or parisons produced in the blank mold.

In the drawing, the numerals 10 and 11 designate a pair of complementary blank mold parts of a conventional bottle blowing machine, the mold parts being shown swung to open position with the complementary cavity formations of the mold parts designated 12 and 13, respectively.

The usual neck ring which forms the bottom end of the blank mold when the mold parts are closed is designated 14 and a parison or blank designated 15 is held thereby, having just been found in the blank mold from the usual gob of hot glass. The neck ring 14 is at the outer end of a conventional invert arm 16 which is pivoted as at 17 for swinging movement which moves parison 15 from the position shown to a blow mold in a manner which is well known to those familiar with the glass container art.

In the drawing a duct which supplies cooling air to the blank mold 10, 11 is shown at 20. This duct divides into branch ducts 21 and 22 which terminate in outlet members 23 and 24, respectively, whose cold air discharge faces are directed toward each other to cool the blank mold lying therebetween.

A transversely adjustable slide valve 25 in duct 20 regulates the flow of cooling air to the outlets 23 and 24 and is positionally controlled by a reversible electric gear motor 26 which rotates an adjusting arm 27 which in the schematic illustration is connected to slide valve 25 by a pivoted link 28.

An infra-red sensitive photoelectric cell is shown at 30 and is directed at or focused upon the parison 15. Ordinarily the best temperature reading results will be obtained by aiming the cell or tube 30 at the hottest part of the parison although this is not essential since, in any event, the tube 30 will be directed at the same point on each successive parison and will therefore give consistent comparative temperature readings as to successive parisons or blanks.

In the drawing an electrical control panel is designated 32 and supports a conventional amplifier 33 for the signal from the photo-tube 30, a conventional electrical recorder 34 of the type which includes a retransmitting slide wire, and a position adjusting controller 35 which is actuated by the slide wire of recorder 34 and in turn actuates gear motor 26 in opposite directions in response to variations in the temperature sensed by photo-tube 30 as amplified and transmitted through controller 35.

Since the temperature indication of the photo-tube is only meaningful at a predetermined instant or very short time period in each cycle, means are provided whereby the signal from the photo-tube 30 to the recorder 34 is interrupted excepting during this critical instant or short time period. Otherwise the temperature indication would fall rapidly each time an invert cycle carried a parison from the position shown in the drawing.

In the drawing the numeral 37 designates the timing drum of a conventional I.S. (individual section) glass bottle blowing machine and, as is well known in this art, drum 37 rotates once for each full cycle of operation of the machine. A cam block 38 carried by timing drum 37 operates a limit switch 39 and thus energizes the temperature recording circuitry only briefly, once during each cycle of operation of the machine. Cam block 38 is so located on timing drum 37 as to render the recording circuitry effective only while the parison 15 is in its momentary dwell period after the blank mold 11, 12 has opened and before the invert arm begins its swing to the blow mold.

What is claimed is:

1. In combination with a glass container manufacturing apparatus having a blank mold, a blow mold, and means for transferring a series of hot glass parisons from the blank mold to the blow mold, an infra-red sensitive photoelectric cell directed toward a position occupied by successive parisons between said blank mold and said blow mold to produce temperature readings of successive parisons, means for conducting a coolant to said blow mold, and means acting between said cell and said coolant conducting means for regulating the flow of coolant to said blow mold in proportion to the temperature of successive parisons as measured by said cell.

2. In combination with a glass container manufacturing apparatus having a blank mold, a blow mold, and means for transferring a series of hot glass parisons from the blank mold to the blow mold, an infra-red sensitive photoelectric cell directed toward a position occupied by successive parisons between said blank mold and said blow mold to produce temperature readings of successive parisons, means operating in timed relation with said transfer means for rendering said photoelectric cell effective momentarily during each manufacturing cycle only when parisons are in said position, means for conducting a coolant to said blow mold, and means acting between said cell and said coolant conducting means for regulating the flow of coolant to said blow mold in proportion to the temperature of successive parisons as measured by said cell.

3. In combination with a glass container manufacturing apparatus having a blank mold, a blow mold, and means for transferring a series of hot glass parisons from the blank mold to the blow mold, means for conducting a coolant to said blow mold, and coolant control means comprising an infra-red sensitive photoelectric cell directed toward a position occupied by successive parisons between said blank mold and said blow mold to produce electrical impulses proportionate to temperature readings of successive parisons, and means acting between said cell and said coolant control means for regulating the flow of coolant to said blow mold in response to variations in the magnitude of said electrical impulses.

4. In combination with a glass container manufacturing apparatus having a blank mold, a blow mold, and means for transferring a series of hot glass parisons from the blank mold to the blow mold, means for conducting a coolant to said blow mold, and coolant control means comprising an infra-red sensitive photoelectric cell directed toward a position occupied by successive parisons between said blank mold and said blow mold, means operating in timed relation with said transfer means for rendering said cell effective to produce electrical impulses proportionate to temperature readings of successive parisons in said position, and means acting between said cell and said coolant control means for regulating the flow of coolant to said blow mold in response to variations in the magnitude of the succession of electrical impulses thus produced.

5. In combination with a glass container manufacturing apparatus having a blank mold, a blow mold, and means for transferring a series of hot glass parisons from the blank mold to the blow mold, an infra-red sensitive photoelectric cell directed toward a position occupied by successive parisons between said blank mold and said blow mold to produce temperature readings of successive parisons, means for cooling said blow mold, and means acting between said cell and said cooling means for regulating the latter in proportion to the temperature of successive parisons as measured by said cell.

6. In combination with a glass container manufacturing apparatus having a blank mold, a blow mold, and means for transferring a series of hot glass parisons from the blank mold to the blow mold, an infra-red sensitive photoelectric cell directed toward a position occupied by successive parisons between said blank mold and said blow mold to produce temperature readings of successive parisons, means operating in timed relation with said transfer means for rendering said photoelectric cell effective momentarily during each manufacturing cycle only when parisons are in said position, means for cooling said blow mold, and means acting between said cell and said cooling means for regulating the latter in proportion to the temperature of successive parisons as measured by said cell.

7. In combination with a glass container manufacturing apparatus having a blank mold, a blow mold, and means for transferring a series of hot glass parisons from the blank mold to the blow mold, means for cooling said blow mold, means for controlling said cooling means comprising an infra-red sensitive photoelectric cell directed toward a position occupied by successive parisons between said blank mold and said blow mold to produce electrical impulses proportionate to temperature readings of successive parisons, and means acting between said cell and said control means for regulating the temperature of said blow mold in response to variations in the magnitude of said electrical impulses.

8. In combination with a glass container manufacturing apparatus having a blank mold, a blow mold, and means for transferring a series of hot glass parisons from the blank mold to the blow mold, means for cooling said blow mold, and means for controlling said cooling means comprising an infra-red sensitive photoelectric cell directed toward a position occupied by successive parisons between said blank mold and said blow mold, means operating in timed relation with said transfer means for rendering said cell effective to produce electrical impulses proportionate to temperature readings of successive parisons in said position, and means acting between said cell and said control means for regulating the temperature of said blow mold in response to variations in the magnitude of said electrical impulses.

9. In combination with a glass container manufacturing machine having a blank mold, a blow mold, and means for transferring a series of hot glass parisons from the blank mold to the blow mold, means for obtaining instantaneous temperature measurements from successive parisons between said blank mold and said blow mold at predetermined time intervals in the machine cycle, means for conducting a coolant to said blow mold, and means acting between said temperature measurement means and said coolant conducting means for regulating the flow of coolant to said blow mold in proportion to the temperature of successive parisons.

10. In combination with a glass container manufacturing machine having a blank mold, a blow mold, and means for transferring a series of hot glass parisons from the blank mold to the blow mold, means for obtaining instantaneous temperature measurements from successive parisons between said blank mold and said blow mold at predetermined time intervals in the machine cycle, means for cooling said blow mold, and means acting between said temperature measurement means and said cooling means for regulating the latter in proportion to the temperature of successive parisons.

11. In combination with a glass container manufacturing machine having a blank mold, a blow mold, and means for transferring a series of hot glass parisons from the blank mold to the blow mold, means for conducting a coolant to said blow mold, coolant control means comprising means for taking instantaneous temperature measurements from successive parisons between said blank mold and said blow mold to produce electrical impulses proportionate to temperature readings of successive parisons at corresponding points in the machine cycle, and means acting between said temperature measurement means and said coolant conducting means for regulating the flow of coolant to said blow mold in response to variations in the magnitude of said electrical impulses.

12. In combination with a glass container manufacturing machine having a blank mold, a blow mold, and means for transferring a series of hot glass parisons from the blank mold to the blow mold, means for cooling said blow mold, cooling control means comprising means for taking instantaneous temperature measurements from successive parisons between said blank mold and said blow mold to produce electrical impulses proportionate to temperature readings of successive parisons at corresponding points in the machine cycle, and means acting between said temperature measurement means and said cooling control means for regulating the latter in response to variations in the magnitude of said electrical impulses.

References Cited
UNITED STATES PATENTS

| | | | |
|---|---|---|---|
| 2,402,475 | 6/1946 | Waterbury et al. | 65—355 X |
| 2,658,687 | 11/1953 | Southworth | 65—162 X |
| 3,203,777 | 8/1965 | Berry et al. | 65—355 X |

S. LEON BASHORE, *Acting Primary Examiner.*

A. D. KELLOGG, *Assistant Examiner.*